May 25, 1926.
H. WEICHSEL
ALTERNATING CURRENT MOTOR
Filed May 21, 1924
1,586,231
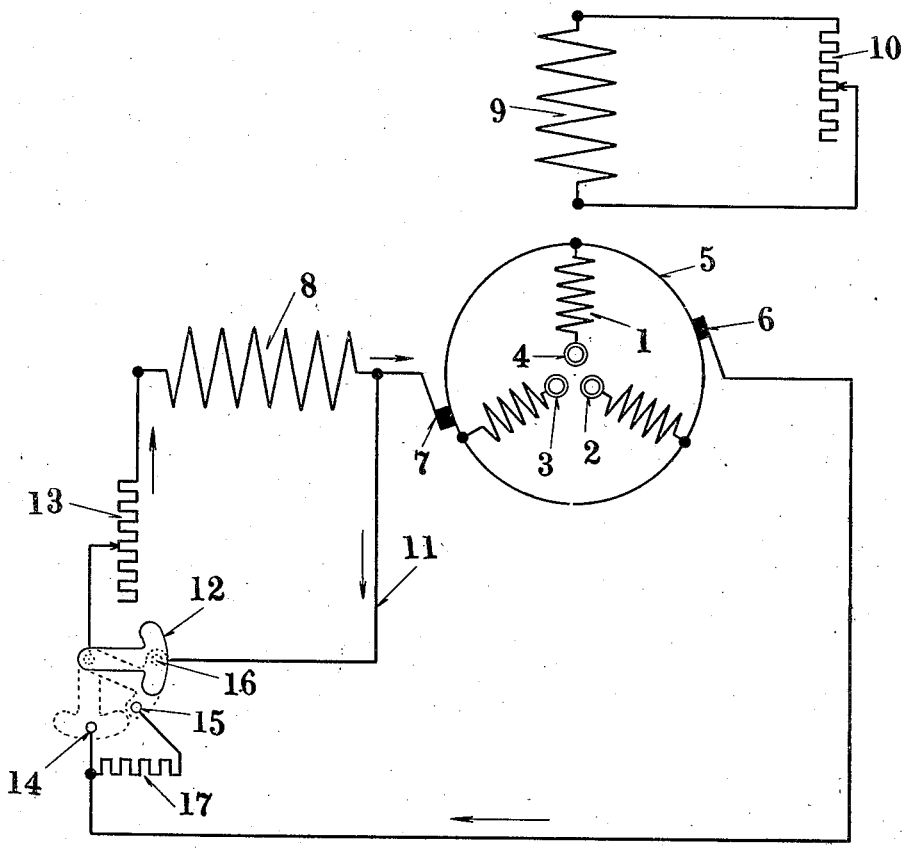
INVENTOR
Hans Weichsel
BY E. E. Huffman
ATTORNEY Patented May 25, 1926.

1,586,231

UNITED STATES PATENT OFFICE.

HANS WEICHSEL, OF ST. LOUIS, MISSOURI, ASSIGNOR TO WAGNER ELECTRIC CORPORATION, OF ST. LOUIS, MISSOURI, A CORPORATION OF DELAWARE.

ALTERNATING-CURRENT MOTOR.

Application filed May 21, 1924. Serial No. 714,759.

My invention relates to means for and method of starting an alternating current motor of the self-excited synchronous type. Among the objects of my invention are to eliminate polyphase currents from the commutator at starting and thus avoid commutation difficulties which these may cause, and to reduce the resistance of the secondary starting circuits to the lowest possible value whereby a maximum induction motor speed (minimum slip) may be attained by the machine prior to making the connections whereby the machine may be caused to operate as a synchronous motor.

Referring to the accompanying drawing showing the embodiment of my invention the motor, when operating as a synchronous machine, comprises an inducing member which, in the machine illustrated, is the revolving member, provided with a polyphase winding 1 supplied with polyphase currents through slip rings 2, 3 and 4. The induced member is also provided with a commuted winding 5 which may be interconnected with the polyphase winding if desired, and with brushes 6—7. The stator carries an exciting winding 8 in circuit with these brushes and displaced by a small angle from the brush axis. Since, as is well understood, the E. M. F. appearing at the brushes 6—7 is a direct current E. M. F. at synchronous speed, the winding 8 on which this E. M. F. is impressed supplies the necessary unidirectional excitation of the machine. The slight displacement of the axis of the winding 8 from the brush axis results in one component of the exciting magnetization being so located as to satisfactorily influence the power factor of the machine and yet this angular displacement is preferably kept small in order that the winding 8 may be in position to contribute to the development of a good synchronizing torque should the machine be temporarily pulled out of step by over load.

Referring to the means for starting the machine described, the stator is provided with a winding 9 axially displaced from the winding 8 and adapted to be closed on itself through adjustable resistance 10. Means including the conductor 11 and the switch 12 are also provided for closing the winding 8 on itself at starting over adjustable resistance 13. The switch 12 is provided with contacts 14, 15 and 16 and is adapted to interconnect contacts 15 and 16 in one of its positions, and contacts 14 and 15 in another position. A resistance 17 is included in circuit between the brush 6 and the contact point 15.

To start the machine described, resistances 10 and 13 are set at a suitable value and switch 12 is located in the position shown in full lines in the drawing where, through contact 16, it establishes a closed circuit through winding 8, and the brush circuit is left open. Polyphase current being supplied to the slip rings, currents are induced in the windings 8 and 9 and the machine starts as an induction motor. The resistances 10 and 13 can then be reduced in one or more steps and preferably the winding 9 is short-circuited. When the machine has reached its maximum induction motor speed which, unless the machine is over loaded, will closely approach the synchronous speed in my machine, the switch 12 is moved to its running position in which, through contact 14, it places the brushes in circuit with the winding 8. In moving from the starting position to the running position the switch interconnects contact points 15 and 16, before passing off contact 16, and therefore before placing the conductor 11 in open-circuit. At maximum induction motor speed the induced current flowing in the conductor 11 is in the opposite direction to the current which will be delivered from the commutator when contacts 15 and 16 are interconnected, and by suitably proportioning the resistance 17 the current in conductor 11 can be made substantially zero at the time this conductor is open-circuited and therefore sparking at this time, when the switch is moved from starting to running position, will be avoided. It will be understood that the movement of the switch from starting to running position is continuous and that resistance 17 remains in the circuit only momentarily. Should the load on the machine during its running position come heavy enough to cause it to fall out of synchronism it will continue to operate as an induction motor, the windings 8 and 9 again operating as secondary induced windings.

It will be understood that my invention is applicable to single phase as well as polyphase motors and to machines in which the inducing and commuted windings are on the stationary member.

Having fully described my invention, what I claim as new and desire to secure by Letters Patent of the United States is:

In an alternating current motor, the combination of an inducing member provided with a commutator and slip rings, an induced member provided with an exciting winding and a second winding displaced therefrom and closed on itself, switching means associated with the exciting winding, said means being adapted when in one position to connect the exciting winding in series with the commutator and in another position to disconnect it from the commutator and close it on itself, and means for including a resistance between the commutator and a conductor forming part of the means forming a closed circuit through the exciting winding, said resistance being proportioned to limit the current delivered by the commuted winding to substantially the same value as the induced current flowing through the exciting winding.

In testimony whereof, I have hereunto set my hand this the 15th day of May, 1924.

HANS WEICHSEL.